Jan. 7, 1964
L. C. WASSON
3,116,748
PRESSURE RESPONSIVE MIXING VALVE
Filed Dec. 4, 1961
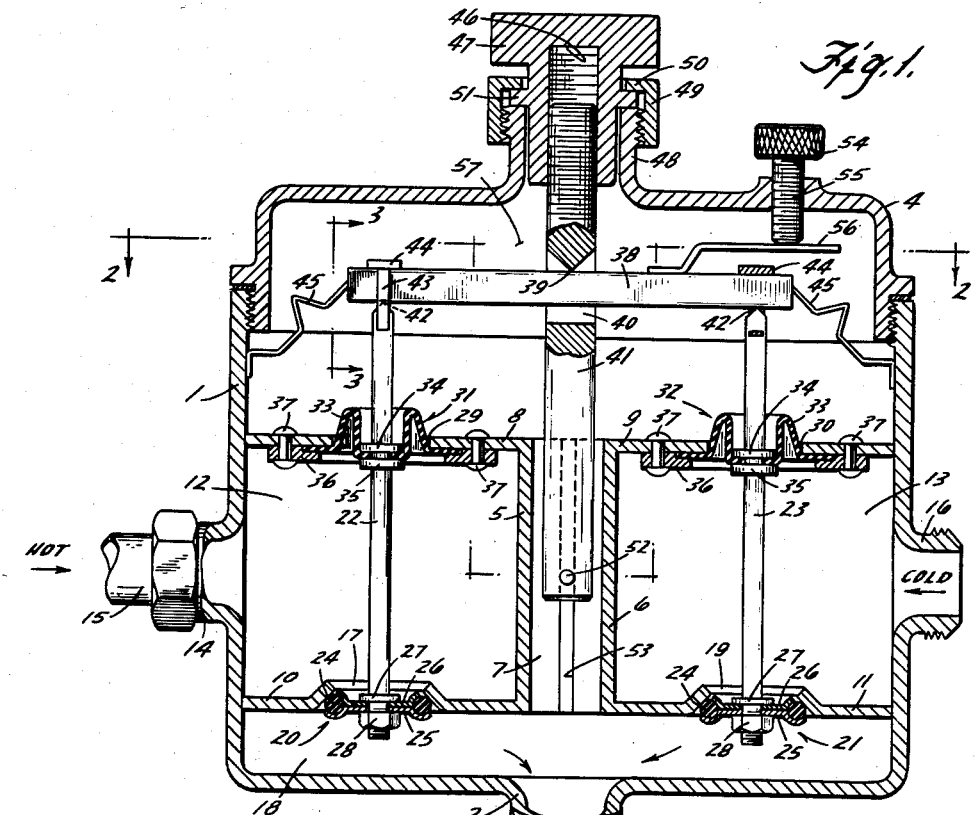
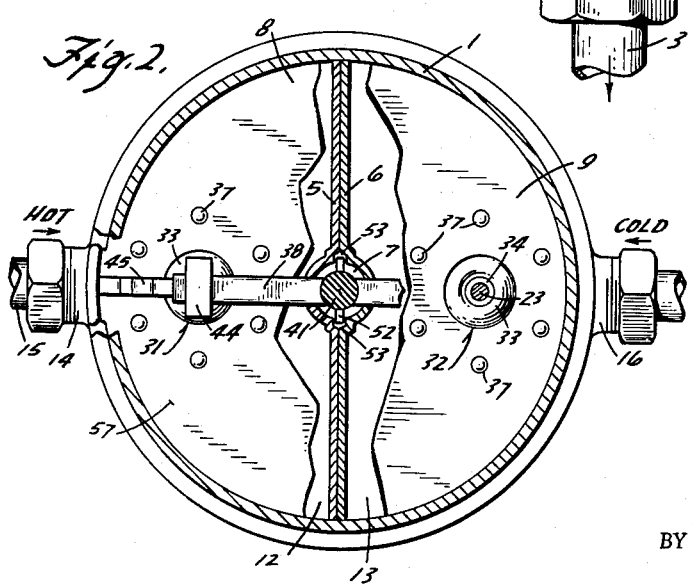
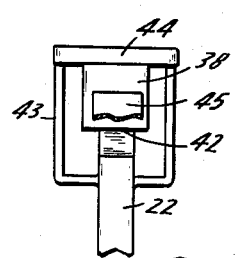
INVENTOR.
LOERWOOD C. WASSON
BY
ANDRUS & STARKE
ATTORNEYS.

3,116,748
PRESSURE RESPONSIVE MIXING VALVE
Loerwood C. Wasson, 8322 Avon Court,
Wauwatosa 13, Wis.
Filed Dec. 4, 1961, Ser. No. 156,845
9 Claims. (Cl. 137—98)

This invention relates to a fluid mixing valve and more particularly to a mixing valve which is responsive to changes in pressure in the supply lines of hot and cold liquids and utilizes the energy in the pressure change to adjust the flow of liquid to maintain a constant temperature.

The normal mixing valve used to control the temperature of water, as in a shower bath fixture or the like, accomplishes the mixing function by adjusting the orifices of the hot and cold water supplies to provide a given temperature of outgoing water. As long as the pressures of both the hot and cold water remain constant, the temperature of the outgoing water will be constant. If the pressure of either of the supply lines changes, the flow proportion is disturbed with a consequent change in temperature of the outgoing water. In a shower bath, a sudden increase of pressure in the hot water line can cause scalding, while in other commercial applications, such as photofinishing processes or dishwashing systems, an abrupt change in temperature can adversely affect the process being carried on.

In order to overcome this weakness of the conventional mixing valve, it is necessary to utilize some characteristic of the system which will respond to changes in the temperature or pressure as fast as they occur. Thermal sensing devices are not satisfactory because of the time lag involved in heating up the thermal element.

In the past other attempts have been made to sense the change in pressure in the supply lines and utilize this energy to adjust the flow of water. In the Assmann Patent 962,111, for example, a mixing valve is disclosed which senses the change in pressure in the supply lines and utilizes a reciprocating piston which changes the area of the outlet orifice. However, from a practical standpoint devices as disclosed in the Assmann patent are not satisfactory because of scale formation and corrosion which adversely affect and interrupt the sliding fit between the piston and the cylinder.

The present invention is directed to a mixing valve which senses the change in pressure in the supply lines and operates through a pivotable actuating bar to utilize the energy to adjust the flow of water to maintain a constant temperature. More specifically, the apparatus includes an outer casing which defines separate hot and cold water inlet chambers and a mixing chamber. Both the hot and cold water chambers are provided with outlet orifices which communicate with the mixing chamber and the flow through the orifices is controlled by valves. Each of the valves is carried by a valve stem which extends in sealed relation through an opening in a flexible diaphragm. Each diaphragm closes off a second opening between the respective hot and cold water chambers and the mixing chamber. The ends of the valve stems are pivotally connected to the ends of a pivotable actuating bar and the bar, as well as the valve stems and valves, is moved to open and close the valves by a hand knob which is located on the exterior of the casing and carries a shaft which engages the actuating bar. By turning the knob in one direction, the valves are opened to admit both hot and cold water to the mixing chamber. By turning the knob in the opposite direction, the pressure within the chambers returns the valve members to the closed position and creates a positive seal to close off all flow.

When a pressure drop occurs in one of the supply lines, say in the cold water line, the pressure on the flexible diaphragm associated with the cold water chamber is decreased. Because the pressure in the hot water chamber remains constant, a pressure difference, operating through the pivoted actuating bar, exists which drives the cold water valve toward a more open position, while at the same time reducing the opening of the hot water valve. This action takes place in opposition to spring forces having spring rate adapted to adjust only enough to maintain a predetermined ratio of flow from the hot and cold water chambers.

The relationship between the flow of water through the variable orifices and the pressure drop across them follows a predictable pattern and the structure is designed to keep the temperature of the discharged water relatively constant in spite of large variations in pressure in either the hot or cold water supply lines.

The pivotal connection is located in an area where there is substantially no flow of water, thereby tending to reduce scale formation at the points where friction buildup due to scale and/or corrosion would adversely affect the performance of the valve. Of even greater importance in maintaining trouble-free operation is the fact that all moving parts are so located and operated that if scale or corrosion should occur, its effect on the operating forces is negligible.

Other objects and advantages will appear in the course of the following description.

The drawings illustrate the best mode presently contemplated of carrying out the invention.

In the drawings:

FIGURE 1 is a vertical section of the mixing valve of the invention;

FIG. 2 is a transverse section taken along line 2—2 of FIG. 1; and

FIG. 3 is an enlarged view taken along line 3—3 of FIG. 1.

The drawings illustrate a pressure responsive mixing valve which includes an outer casing 1, and the bottom surface of the casing is provided with a threaded outlet nipple 2 which is connected to a discharge conduit 3. The open end of the casing 1 is enclosed by a cover 4 which is threaded onto the end of the casing.

A pair of walls 5 and 6 extend diametrically across the casing 1 and the central portion of each wall is deformed outwardly to provide a central axial passage 7. A pair of top walls 8 and 9 connect the upper edges of the walls 5 and 6 to the casing 1 and similarly a pair of bottom walls 10 and 11 connect the lower edges of the walls 5 and 6 to the casing. The walls 5, 8 and 10 define a hot water inlet chamber 12, while the walls 6, 9 and 11 define a cold water inlet chamber 13.

To introduce hot water into the chamber 12, the casing 1 is provided with a threaded nipple or stud 14 which is connected to a hot water supply conduit 15. A similar threaded nipple 16 is provided in the opposite portion of the casing wall and connects the cold water chamber 13 with a cold water supply conduit, not shown.

Hot water from chamber 12 is adapted to pass through an orifice 17 in the lower wall 10 into a mixing chamber 18, while cold water from the cold water chamber 13 passes through an orifice 19 in bottom wall 11 to the mixing chamber. The hot and cold water is mixed within the chamber 18 and is discharged through the outlet 2 to the location of use.

The orifices 17 and 19 are adapted to be closed off by valve members 20 and 21, respectively, which are carried by valve stems 22 and 23. The valve members 20 and 21 are of identical construction and each valve member includes an annular sealing member 24 which is retained between a lower disc 25 and an upper disc 26 with both of the discs being carried by the lower end of the respective valve stem. The discs 25 and 26 are retained on the stem by a washer 27 and a nut 28 which is threadedly engaged with the lower end of the valve stem.

Each of the upper walls 8 and 9 is also provided with an opening 29 and 30 which are in alignment with orifices 17 and 19. The openings 29 and 30 are closed off by flexible diaphragm assemblies 31 and 32.

The diaphragm assemblies 31 and 32 may be of identical construction and each includes a diaphragm 33 which seals off the respective openings. The valve stem extends through an opening in the diaphragm 33 and the diaphragm is secured to the valve stem by washers 34 and 35 which are located on either side of the diaphragm.

To seal the diaphragms 33 with respect to the walls 8 and 9 the periphery of the diaphragm is clamped against the lower surface of the wall by an annular retaining disc 36 which is secured to the wall by screws 37.

Each diaphragm 33 is provided with a reverse bend to enable the diaphragm to move a substantial distance in response to pressure changes within the respective hot and cold water chamber. A pressure exerted within one of the chambers 12 or 13 will cause the diaphragm 33 to tend to move upwardly, thus biasing its particular valve toward the closed position. As the pressure is reduced within the chamber, the diaphragm will move downwardly, thereby lowering the valve stem and opening the valve member.

The upper end of each of the valve stems 22 and 23 is pivotally connected to the ends of an actuating bar 38, and the central portion of bar 38 is fulcrumed on a knife edge 39 provided in a central opening 40 in rod 41.

To pivotally connect the valve stems 22 and 23 to bar 38, the upper edge of each stem is tapered to a knife edge as indicated at 42 and the bar 38 is supported on the knife edges. A yoke 43 is attached to the upper portion of each valve stem and straddles the actuating bar 38. The upper ends of the arms of the yoke 43 are connected by a bar 44 which is either in contact with the upper surface of bar 38 or slightly out of contact therewith.

The actuating bar 38 is biased downwardly into engagement with the knife edges 42 by a pair of leaf springs 45. One end of each leaf spring is secured to the ends of the bar 38 and the springs 45 extend downwardly at an angle with the lower ends of the springs being connected to the casing wall 1. The leaf springs 45 not only function to bias the bar 38 into engagement with the knife edges 42, but also serve to center the actuating bar 38 and prevent lateral movement of the same.

The upper end of central rod 41 is threadedly engaged within a central recess 46 in a hand knob 47 which is disposed within a boss 48 in cover 4. The joint between the hand knob 47 and the boss 48 is sealed by an annular seal 49 which is threadedly engaged with boss 48. The seal 49 is provided with an inwardly extending flange 50 which engages a rim 51 on the hand knob 47.

The lower end of the rod 41 extends downwardly within the central passage 7 and rotation of the rod 41 is prevented by a pin 52 which extends diametrically through the rod 41 and rides within guideways 53 formed in the walls 5 and 6. With this construction, rotating the hand knob 47 will cause the rod 41 to move with straight line motion inwardly and outwardly within the casing 1. By rotating the hand knob 47 in one direction, the rod 41 will move downwardly, engaging the actuating bar 38 and also moving the bar downwardly. Downward movement of the bar will cause the valve stems 22 and 23 to move downwardly against the bias of pressure in the chambers and open the valves 20 and 21. Conversely, by rotating the knob 47 in the opposite direction, the knife edge 39 will move out of engagement with the actuating bar 38, thereby enabling the pressure within the chambers 12 and 13 to move the diaphragm assemblies 31 and 32 upwardly to close the valves. Further rotation in the same direction will cause bar 38 to engage bar 44 and develop a positive sealing pressure which is independent of pressure in the chamber.

The temperature of the water being discharged through the discharge outlet 2 is controlled by a temperature actuating knob 54 having a threaded stem 55 which is engaged within an opening in the cover 4. The inner end of the stem 55 engages a spring member 56 which is secured to the upper surface of actuating bar 38. By turning the knob 54 inwardly, the end of the stem 55 bears against the spring-like member 56. As this member is deflected, a force is exerted to unbalance the otherwise balanced forces due to pressures in the chambers, and due to the springs 45. This unbalanced force causes a shift in the position of the bar 38, which is reflected in a shift of the relative positions of valves 20 and 21 to vary the ratio of hot and cold water delivered to the mixing chamber when the pressures in the chambers are normal.

It is contemplated that the temperature control knob 54 may be incorporated with the knob 47 rather than being a separate and independent member.

In operation of the apparatus, the knob 47 is initially rotated to thereby move the actuating bar 38 downwardly and open the valves 20 and 21. Water within the hot and cold water chambers 12 and 13 will then pass through the open valves 20 and 21 into the mixing chamber 18 and be discharged through the outlet opening 2. If the temperature of the water is to be changed, the knob 54 can be turned, thereby adjusting the balance of forces on the actuating bar 38, causing it to pivot and so open one valve a greater extent while causing the other valve to close a corresponding amount to obtain the desired mixed water temperature.

If a pressure change in one of the water supply lines should occur, as for example, a decrease in the cold water supply line, the pressure within the cold water chamber 13 will decrease. This decrease in pressure within chamber 13 will cause the diaphragm 33 of diaphragm assembly 32 to move downwardly, causing a corresponding downward movement of valve stem 23 resulting in valve member 21 opening to a greater degree.

The downward movement of the valve stem 23 will serve to pivot the actuating bar 38 and thereby cause the other valve stem 22 to move upwardly resulting in valve 20 being closed to a greater degree. Therefore the decrease in pressure in the cold water chamber will be immediately and automatically employed to further open the cold water valve and partially close the hot water valve to compensate for the pressure change and maintain a uniform water temperature at the outlet.

Scale formation and corrosion of operating parts are a major cause of failure of any working parts located in the water zone, particularly when those parts are subjected to sliding friction. In the present invention the pivotal connections between the valve stems 22 and 23 and the actuating bar 38 and rod 41 are provided by the knife edge contacts which are relatively insensitive to scale formation and corrosion. In addition, the knife edges are located in the chamber 57 in the upper portion of the casing 1 with the only communication between the chamber 57 and the mixing chamber 18 being the clearance between the rod 41 and the walls 5 and 6 in passage 7. As the mixed water must flow through this restricted passage, there is relatively little water flow in the chamber 57. As scale formation and corrosion are proportional to the rate of water flow, the pivotal connections between the valve stems and the actuating bar will not be subject to any substantial scale formation or corrosion.

It is also contemplated that the bottom of the passage 7 may be completely closed off at its lower end so that the upper chamber 57 is sealed from the mixing chamber 18. With this type of construction, no water will be present in the upper chamber 57 and therefore corrosion and scale formation will be completely eliminated. By sealing off the chamber 57 from the mixing chamber, there will, however, be a greater pressure differential between the chamber 57 and the hot and cold water chambers 12 and 13 making it necessary to use larger springs 45 in order to overcome this more steeply graded pressure differential.

It is further contemplated that this structure not be limited to hot water mixing, but may be used with any fluids in which it is desirable to maintain a constant ratio of two fluids as they are being mixed, in spite of fluctuating pressures in the supply lines.

Various modes of carrying out the invention are contemplated as being within the scope of the following claims particularly pointing out and distinctly claiming the subject matter regarded as the invention.

I claim:

1. A pressure responsive mixing valve, comprising,
   (a) a casing defining a hot water chamber, a cold water chamber, a mixed water chamber and an operating chamber closed off from said hot water chamber and said cold water chamber, said hot water chamber having a hot water outlet orifice communicating with the mixed water chamber and said cold water chamber having a cold water outlet orifice communicating with said mixed water chamber,
   (b) first valve means for controlling the flow of hot water through the hot water outlet orifice and adapted to be moved from an open to a closed position,
   (c) second valve means for controlling the flow of cold water through the cold water outlet orifice and adapted to be moved from an open to a closed position,
   (d) first pressure responsive means responsive to the pressure within the hot water chamber and operably connected to said first valve means,
   (e) second pressure responsive means responsive to the pressure within the cold water chamber and operably connected to the second valve means,
   (f) restricted passage means providing communication between said mixed water chamber and said operating chamber whereby water at a mixed temperature can enter said operating chamber,
   (g) a pivotable member pivotally connected at a first location to said first pressure responsive means and pivotally connected at a second location to said second pressure responsive means, and
   (h) means for fulcruming said pivotable member at a position between said first and second locations whereby movement of said first pressure responsive means in one direction causes movement of the second pressure responsive means in the opposite direction to thereby effect movement of the first valve member from the open to closed position and simultaneously effect movement of the second valve member from the closed to the open position to thereby vary the flow through said orifices in accordance with pressure changes.

2. A pressure responsive mixing valve, comprising
   (a) a casing defining a first fluid chamber, a second fluid chamber, a mixing chamber and an operating chamber, said first fluid chamber having a first fluid outlet orifice communicating with said mixing chamber and having an opening communicating with the operating chamber, said second fluid chamber having a second fluid outlet orifice communicating with said mixing chamber and having an opening communicating with said operating chamber,
   (b) a flexible pressure responsive member sealing each of said openings,
   (c) a valve member operably associated with each orifice to control the flow of fluid through said orifice and adapted to be moved from an open to a closed position,
   (d) a connecting member operably connecting the pressure responsive member and the valve member of each chamber with an end of each connecting member extending into said operating chamber, and
   (e) operating means located in said operating chamber and pivotally connecting said ends of said connecting members for effecting movement of said first valve member in a direction from the open to the closed position and for simultaneously effecting movement of the other valve member in a direction from the closed to the open position to thereby change the proportion of flow through said orifices in accordance with pressure variations and maintain a constant ratio of first fluid and second fluid in the mixing chamber.

3. The structure of claim 2 in which said operating means includes
   (a) a bar having its ends pivotally connected to the ends of said connecting members,
   (b) an operating member having one end located on the exterior of the casing and being pivotally connected to the central portion of said bar, and
   (c) means for mounting said operating member for movement in a direction parallel to the direction of movement of the valve members.

4. The structure of claim 3 and including temperature control means operably connected to the bar for pivoting the bar with respect to the operating member to thereby vary the position of the valve members with respect to the orifices and change the proportion of flow of hot and cold water to said mixed water chamber.

5. The structure of claim 3 in which the pivotal connection between the connecting members and said bar and the pivotal connection between the bar and the operating member comprises a knife edge engagement.

6. A pressure responsive mixing valve, comprising
   (a) a casing defining a hot water chamber, a cold water chamber, a mixed water chamber and an operating chamber, said hot water chamber having a hot water outlet orifice communicating with said mixed water chamber and having an opening communicating with the operating chamber, said cold water chamber having a cold water outlet orifice communicating with said mixed water chamber and having an opening communicating with said operating chamber,
   (b) a flexible pressure responsive member sealing said openings,
   (c) a valve member operably associated with each orifice and located within the mixed water chamber to control the flow of liquid through said orifice and adapted to be moved from an open to a closed position,
   (d) a connecting member secured to each valve member and extending in sealed relation through the corresponding pressure responsive member with an end of said connecting member being located within said operating chamber,
   (e) an actuating bar pivotally connected to the ends of the connecting members,
   (f) an operating member pivotally connected to the central portion of said actuating bar,
   (g) means for mounting the operating member for movement parallel to the direction of movement of the valve members, and
   (h) means for biasing the actuating bar into pivotal engagement with said connecting members.

7. The structure of claim 6 and including means for preventing lateral movement of the actuating bar within the casing.

8. A pressure responsive mixing valve, comprising
   (a) a casing defining a hot water chamber, a cold water chamber, a mixed water chamber and an operating chamber, said hot water chamber having a hot water outlet orifice communicating with said mixed water chamber and having an opening communicating with the operating chamber, said cold water chamber having a cold water outlet orifice communicating with said mixed water chamber and having an opening communicating with said operating chamber, (b) a flexible pressure responsive member sealing said openings, (c) a valve member operably associated with each orifice and located within the mixed water chamber to control the flow of liquid through said orifice and adapted to be moved from an open to a closed position, (d) a connecting member secured to each valve member and extending in sealed relation through the corresponding pressure responsive member with an end of said connecting member being located within said operating chamber, (e) an actuating bar pivotally connected to the ends of the connecting members, (f) a rod, (g) means for mounting the rod for movement in a direction parallel to the direction of movement of valve members, (h) means for pivotally connecting the central portion of the actuating bar to said rod, and (i) a hand knob located on the outside of the casing and operably connected to said rod to move the same, with movement of said rod in one direction serving to simultaneously move both of said valve members to the open position, and a variation in pressure in either the hot water chamber or cold water chamber serving to pivot said bar and move one of said valve members in a direction from the open to the closed position and to move the other valve member in a direction from the closed to the open position to thereby change the proportion of flow through said orifices in accordance with pressure variations.

9. A pressure responsive mixing valve comprising, (a) first conduit means for conducting heated water, (b) second conduit means for conducting cold water, (c) a mixing chamber communicating with said first and second conduit means, (d) an operating chamber closed off from said first and second conduit means, (e) first valve means for controlling the flow of hot water to said mixing chamber, (f) second valve means for controlling the flow of cold water to the mixing chamber, (g) first pressure responsive means responsive to the pressure within said hot water conduit means and operably connected to the first valve means, (h) second pressure responsive means responsive to the pressure within said cold water conduit means and operably connected to the second valve means, (i) operating means pivotally connecting said first and second pressure responsive means and located within the operating chamber for effecting movement of one of said valve means in a direction from the open to the closed position and for simultaneously effecting movement of the second valve means in a direction from the closed to the open position to thereby change the proportion of the flow of hot and cold water to said mixing chamber, and (j) means located on the exterior of the operating chamber for manually opening and closing said valve means.

References Cited in the file of this patent
UNITED STATES PATENTS

| | | |
|---|---|---|
| 1,065,615 | Lawler | June 24, 1913 |
| 2,883,996 | Blewett et al. | Apr. 28, 1959 |
| 2,912,994 | Mori | Nov. 17, 1959 |

FOREIGN PATENTS

| | | |
|---|---|---|
| 325,753 | Great Britain | Feb. 27, 1930 |